United States Patent [19]

Ono et al.

[11] Patent Number: 5,799,765
[45] Date of Patent: Sep. 1, 1998

[54] FLUID CLUTCH

[75] Inventors: Yuichi Ono, Numazu; Mitsuaki Hatori, Tagata-gun; Hiroshi Inuoe, Fuji, all of Japan

[73] Assignee: Usui Kokusai Sangyo Kaisha Limited, Japan

[21] Appl. No.: 207,116

[22] Filed: Mar. 7, 1994

Related U.S. Application Data

[62] Division of Ser. No. 7,486, Jan. 22, 1993, abandoned, which is a division of Ser. No. 750,480, Aug. 27, 1991, abandoned.

[30] Foreign Application Priority Data

| Aug. 30, 1990 | [JP] | Japan | 2-229185 |
| Nov. 6, 1990 | [JP] | Japan | 2-300158 |
| Nov. 19, 1990 | [JP] | Japan | 2-313081 |

[51] Int. Cl.$^6$ .................... F16D 35/00
[52] U.S. Cl. ............ 192/58.62; 192/58.5; 192/82 T; 192/103 R; 123/41.12
[58] Field of Search ............ 192/58 R, 58 B, 192/82 T, 103 R, 58.4, 58.5, 58.62, 58.63; 123/41.12

[56] References Cited

U.S. PATENT DOCUMENTS

| 2,478,058 | 8/1949 | Schantz. | |
| 2,857,979 | 10/1958 | Van Dijck. | |
| 2,864,464 | 12/1958 | Booth. | |
| 3,033,334 | 5/1962 | Herbemar | 192/82 T |
| 3,273,313 | 9/1966 | Livesey et al. | |
| 3,420,069 | 1/1969 | Booth. | |
| 3,469,369 | 9/1969 | Helmke. | |
| 3,630,182 | 12/1971 | Grainger. | |
| 3,631,654 | 1/1972 | Riely et al. | |
| 3,708,965 | 1/1973 | Domnick. | |
| 3,721,069 | 3/1973 | Walker. | |
| 3,727,735 | 4/1973 | La Flame | 192/58 B |
| 3,880,265 | 4/1975 | Elmer | 192/58 B |
| 4,054,156 | 10/1977 | Benson. | |
| 4,082,071 | 4/1978 | Jones. | |
| 4,098,514 | 7/1978 | Guenther. | |
| 4,179,246 | 12/1979 | Volker. | |
| 4,190,426 | 2/1980 | Ruschke. | |
| 4,223,695 | 9/1980 | Muetterties. | |
| 4,271,977 | 6/1981 | Saigne. | |
| 4,401,093 | 8/1983 | Gates, Jr. et al. | |
| 4,444,571 | 4/1984 | Matson. | |
| 4,610,341 | 9/1986 | Hauser et al. | 192/58 B |
| 4,650,045 | 3/1987 | Weible et al. | 192/58 B |
| 4,909,367 | 3/1990 | Elmer | 192/58 B |
| 5,073,262 | 12/1991 | Ahlberg et al. | |
| 5,134,975 | 8/1992 | Friedrichs | 123/41.12 |
| 5,199,539 | 4/1993 | Kikuchi | 192/82 T |
| 5,246,147 | 9/1993 | Gross. | |

FOREIGN PATENT DOCUMENTS

| 60-49133 | 3/1985 | Japan | 192/58 B |
| 2-150515 | 6/1990 | Japan | 192/58 B |
| 401371 | 11/1933 | United Kingdom | 192/58 B |
| 947538 | 1/1964 | United Kingdom | 192/58 B |

*Primary Examiner*—Richard M. Lorence
*Attorney, Agent, or Firm*—Anthony J. Casella; Gerald E. Hespos; Ludomir A. Budzyn

[57] ABSTRACT

A fluid clutch comprises a driving disc rotationally driven by a driving section, a rotatable casing enhousing the driving disc, a blower attached to the casing, and an oil supply means for supplying an oil from an outside to a torque transmission gap between the driving disc and the casing. Further, a driving section may be connected by means of a flexible joint to either one of the casing or the disc. The fluid clutch can always attain optimum control by adjusting the amount of the oil at a high accuracy and rapidly depending on various kinds of operation conditions. A breezer also is provided for releasing gas from the torque transmission chamber when pressure exceeds a predetermined upper limit, and for enabling inflow of atmospheric air to the torque transmission chamber when pressure is less than a predetermined lower limit. The clutch is endurable to external vibrations.

5 Claims, 16 Drawing Sheets

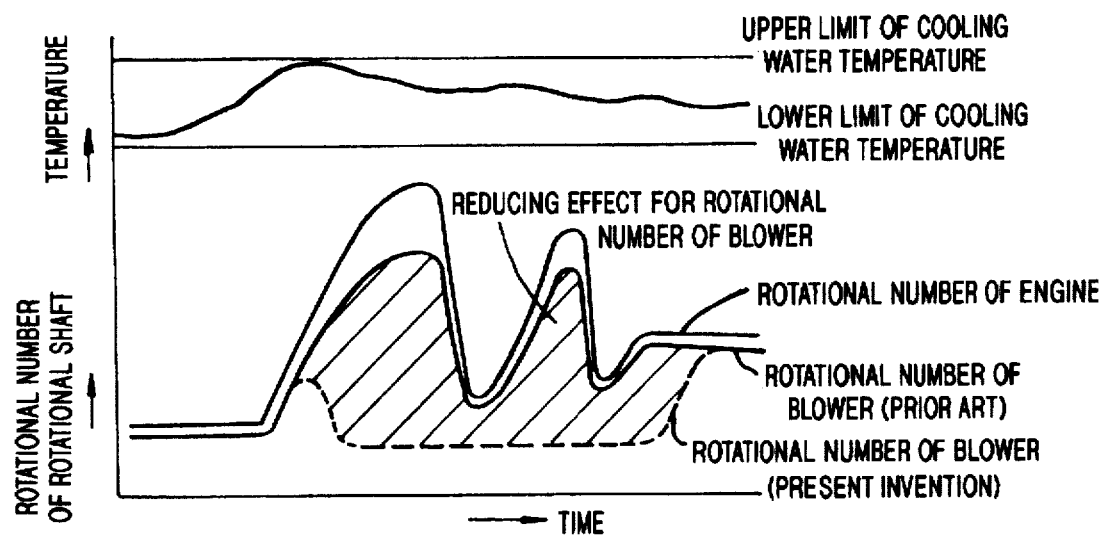
FIG. 4
FIG. 5
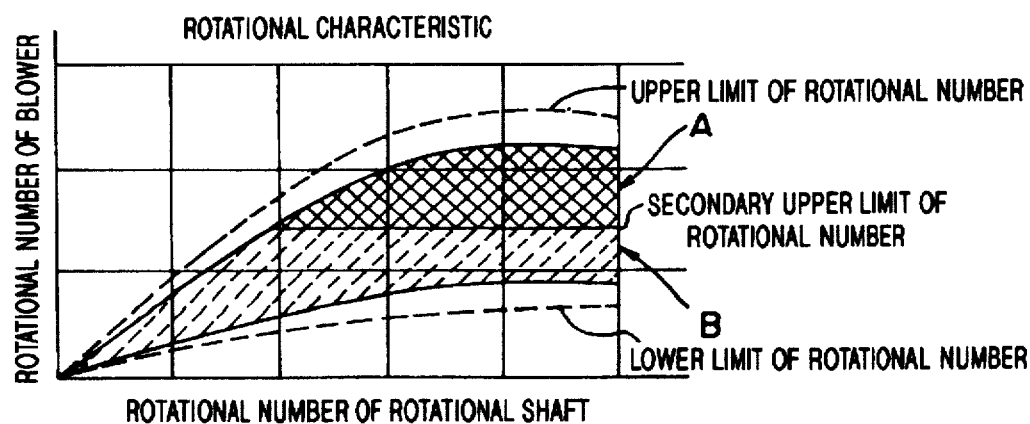

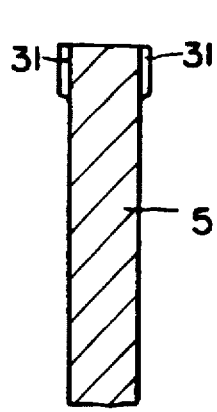 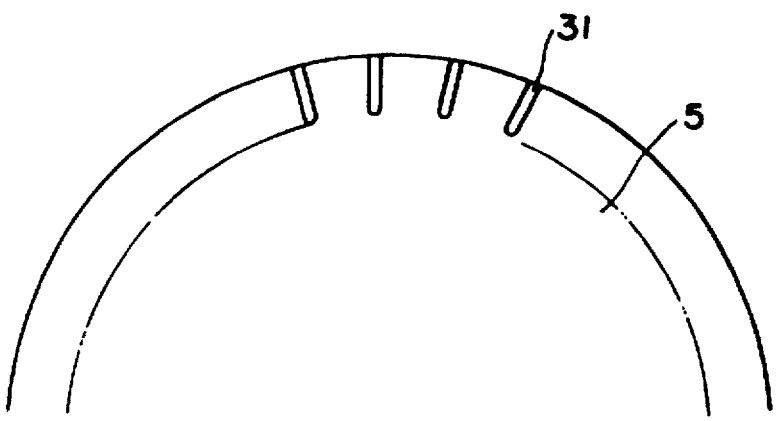
FIG. 17A  FIG. 17B
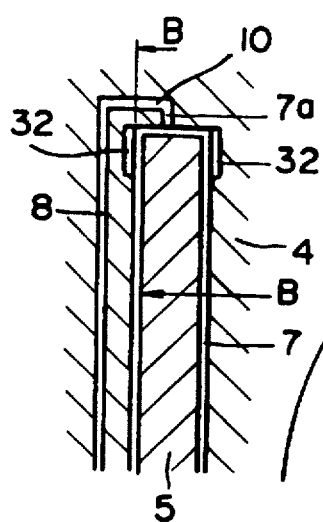 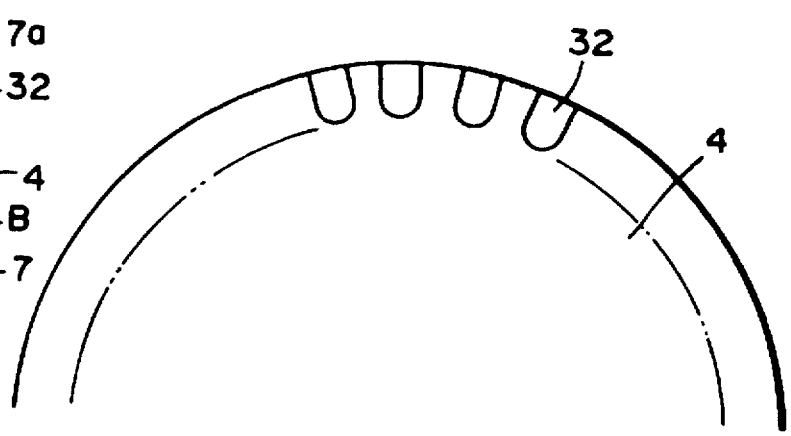
FIG. 18A  FIG. 18B

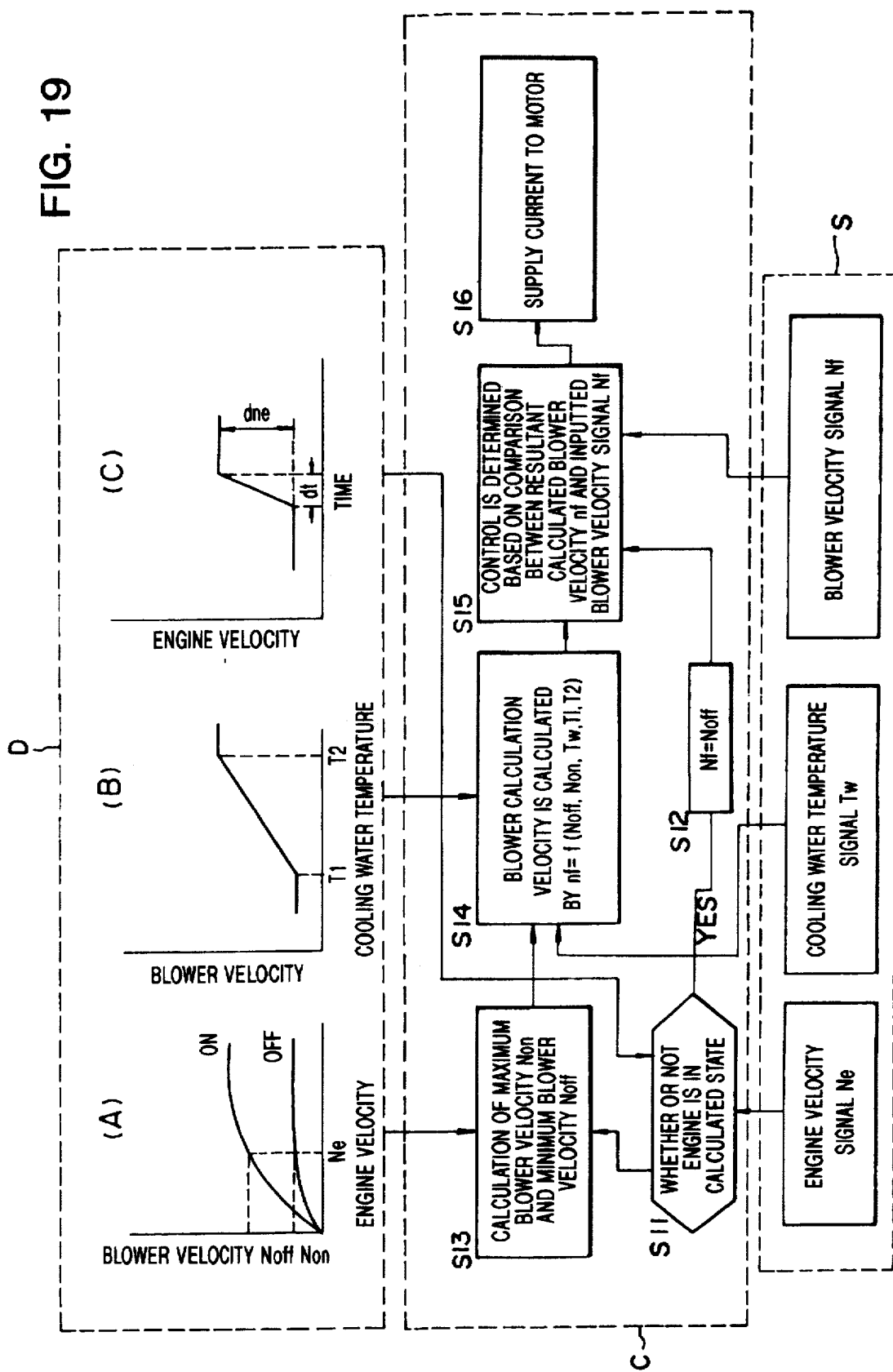

FLUID CLUTCH

This application is a continuation of application Ser. No. 08/007,486 filed Jan. 22, 1993, now abandoned, which in turn was a divisional of application Ser. No. 07/750,480, filed Aug. 27, 1991, now abandoned.

BACKGROUND OF THE INVENTION

1. Field of the Invention

The present invention concerns a fluid clutch and, more in particular, it relates to a fluid clutch adapted to transmit a driving torque of a driving disc to a casing attached with a blower by means of an oil filled in a torque transmission gap of the casing.

2. Description of the Prior Art

A coupling device of a prior art fluid clutch has the inside of a casing divided by a partition plate into a torque transmission chamber and an oil reservoir chamber. An driving disc is disposed in the transmission chamber so as to be rotatable under driving from a driving section. An oil in the oil reservoir chamber is supplied through a flow control hole formed in the partition plate to the transmission chamber and the oil in the transmission chamber is returned by way of a circulation path to the oil reservoir chamber as disclosed, for example, in Japanese Patent Application Sho 63-21048. According to the prior art coupling device of this type, the driving torque of the driving disc is transmitted to the casing by means of the oil supplied from the oil reservoir chamber to the transmission chamber, to rotate the blower attached to the casing, for example, for cooling an automobile engine.

In the existent coupling device as described above, an atmospheric temperature is detected by bimetals and, if the temperature is elevated, the opening degree of the flow control hole is increased to increase the amount of oil in the transmission chamber, and this increases the number of rotations of the casing thereby rotating the blower at a higher speed to improve the cooling effect. However, an automobile engine is driven under various conditions. For instance, while the driving disc is rotated at a high speed, during running on a high way, there is no requirement to rotate the blower at so high a velocity since the cooling effect is increased by an air stream caused by running. Further, upon cold starting, it may be intended to rotate the blower at a low velocity since high speed rotation of the blower will inhibit the operation under warm condition and also cause blower noises. Thus an optimum control is required depending on the operating condition. For satisfying such demands, it is insufficient to control the amount of an oil only depending on the atmospheric temperature.

Further, since the control is conducted by the oil sealed in the casing the existent system, the oil tends to be degraded and accurate control of the oil is impossible to achieve threreby imposing a limit on the control.

Furthermore, in the existent system, since the driving source rotates the driving disc, vibrations or impact shocks from the driving source are directly transmitted to bearings attached to a rotational shaft of the driving disc, to bring about a problem in view of endurance.

OBJECT OF THE PRESENT INVENTION

The present invention has been accomplished in view of the foregoing situations of the fluid clutch of this type and an object of the present invention is to provide a fluid clutch for attaining an optimum control by adjusting the amount of an oil at a high accuracy depending on various kinds of operation conditions.

Another object of the present invention is to provide a fluid clutch of excellent durability.

SUMMARY OF THE INVENTION

The foregoing object can be attained in accordance with the first aspect of the present invention by a fluid clutch comprising a driving section, a rotational shaft rotated under driving from the driving section, a driving disc rotationally driven from the rotational shaft, a casing in which the driving disc is incorporated and which is rotatably disposed around the rotational shaft as a center of rotation, a blower attached to the casing, and an oil filled in a torque transmission gap defined between the driving disc and the casing for transmitting the driving torque of the driving disc to the casing, wherein an oil supply means is disposed for supplying the oil from the outside to the inside of the casing and the oil supply means is connected by way of an oil supply pipe with the casing.

The foregoing object can be attained also in accordance with the second aspect of the present invention by a fluid clutch comprising a driving section, a rotational shaft rotated under driving from the driving section, a cooling device for cooling the driving section, a driving disc rotationally driven from the rotational shaft, a casing in which the driving disc is incorporated and which is rotatably disposed around the rotational shaft as a center of rotation, a blower attached to the casing, and an oil filled in a torque transmission gap defined between the driving disc and the casing for transmitting the driving torque of the driving disc to the casing, wherein the fluid clutch comprises an oil supply means for supplying the oil from the outside to the inside of the casing, and a control means for controlling the supply of the oil by the oil supply means at least based on the number of rotations of the blower, the number of rotations of the rotational shaft and the temperature of cooling water of the cooling device.

The foregoing object can be attained in accordance with the third aspect of the present invention by a fluid clutch comprising a driving section, a rotational shaft rotated under driving from the driving section, a cooling device for cooling the driving section, a driving disc rotationally driven from the rotational shaft, a casing in which the driving disc is incorporated and which is rotatably disposed around the rotational shaft as a center of rotation, a blower attached to the casing, and an oil filled in a torque transmission gap defined between the driving disc and the casing for transmitting the driving torque of the driving disc to the casing, wherein the fluid clutch comprises an oil supply means for supplying the oil by way of the oil supply pipe from the outside to the inside of the casing, a data calculation means for calculating control data using at least the number of rotations of the blower, the number of rotations of the rotational shaft and the temperature of the cooling water of the cooling device as control signals and calculating the control data regarding the control for the oil supply means based on the control signal and a control device for driving the oil supply means based on the control data obtained from the data calculation means.

The foregoing object can be attained in accordance with the fourth aspect of the present invention by a fluid clutch comprising a casing and a disc incorporated therein, a driving section connected by way of a flexible joint to either one of the casing or the disc, bearings for rotatably supporting the other of them to a stationary portion and an oil supply means for supplying an oil from the outside to a torque transmission gap defined between the opposing surfaces of the casing and the disc.

The foregoing object can be attained in accordance with the fifth aspect of the present invention by a fluid clutch comprising a casing and a disc incorporated therein, a driving section connected by way of a flexible joint to either one of the casing or the disc, bearings for rotatably supporting the other of them to a stationary portion and an oil supply means for supplying an oil from the outside to a torque transmission gap defined between the opposing surfaces of the casing and, the disc, and a control means for controlling the supply of the oil by the oil supply means at least based on the number of rotations of the blower, the number of rotations of the casing and the temperature of cooling water to the driving section.

In the first aspect of the present invention, the rotational shaft is rotationally driven by the driving section and the disc is rotationally driven by the rotation of the rotational shaft. An oil is supplied from the outside by way of the oil supply pipe and filled into the torque transmission gap defined between the driving disc and the casing that enhouses the driving disk.

The driving torque of the driving disc is transmitted by means of the oil, and the casing is rotated by the rotation of the driving disc and the blower attached to the casing is rotated.

In the second aspect of the present invention, the oil for transmitting the driving torque of the driving disc to the casing is supplied by the oil supply means from the outside to the torque transmission gap defined between the driving disc and the casing. Then, the supply of the oil is controlled by the control means at least based on the number of rotations of the blower, the number of rotation of the rotational shaft rotationally driven by the driving section and the temperature of the cooling water of the cooling device. In this way, the amount of the oil is controlled properly at a high accuracy and the blower is rotated corresponding to various kinds of operation conditions.

In the third aspect of the present invention, the oil is supplied by the oil supply means from the outside to the torque transmission gap defined between the driving disc and the casing for transmitting the driving torque of the driving disc to the casing. In this case, the control data is calculated by the data calculation means at least based on the number of rotation of the blower, the number of rotation of the rotational shaft and the temperature of the cooling water of the cooling device. Then, since the oil is supplied by the oil supply means based on the control data obtained from the data calculation means, the amount of the oil is controlled properly at a high accuracy and the blower is rotated corresponding to various kinds of operation conditions.

In the fourth aspect of the present invention, the disc or the casing is rotationally driven by the driving section by way of the flexible joint that does not transmit vibrations from the driving section to the casing or the disc, and the casing or the blower attached to the disc contained in the casing is rotated by the oil supplied by the oil supply means from the outside to the torque transmission gap formed between the opposed surfaces of the casing and the disc.

In the fifth aspect of the present invention, the disc or the casing is rotationally driven by the driving section by way of the flexible joint that does not transmit vibrations from the driving section to the casing or the disc. The casing or the blower attached to the disc contained in the casing is rotated by the oil supplied by the oil supply means from the outside to the torque transmission gap formed between the opposed surfaces of the casing and the disc, by the control means at least based on the number of rotation of the blower attached to the casing or the disc, the number of rotation of the casing and the temperature of the cooling water to the driving section.

DESCRIPTION OF THE ACCOMPANYING DRAWINGS

These and other objects, as well as advantageous effects of the present invention will become apparent by reading the detailed descriptions for the preferred embodiments according to the present invention with reference to the accompanying drawings, wherein FIG. 1 is an explanatory view illustrating a constitution of a first embodiment according to the present invention;

FIG. 4 is a characteristic diagram for the number of rotation and the temperature in the first embodiment according to the present invention;

FIG. 5 is a characteristic diagram for the number of rotation of a blower in the first embodiment according to the present invention;

Figures 15A, 15B:
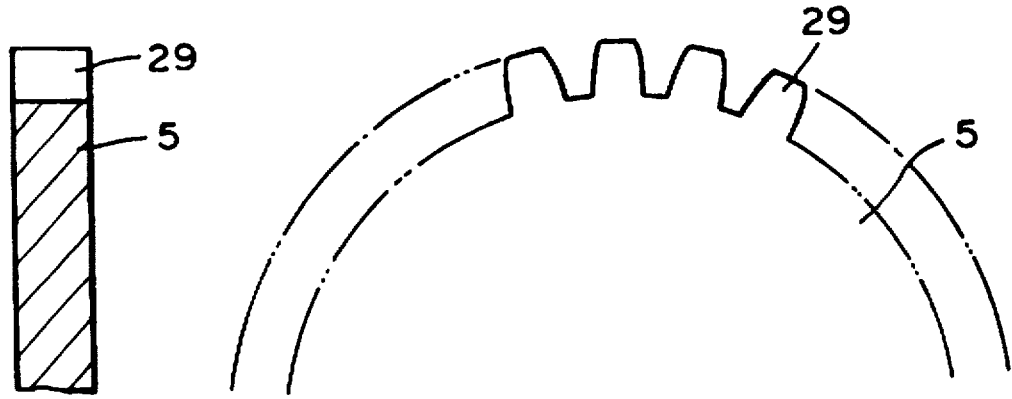
Figures 16A, 16B:
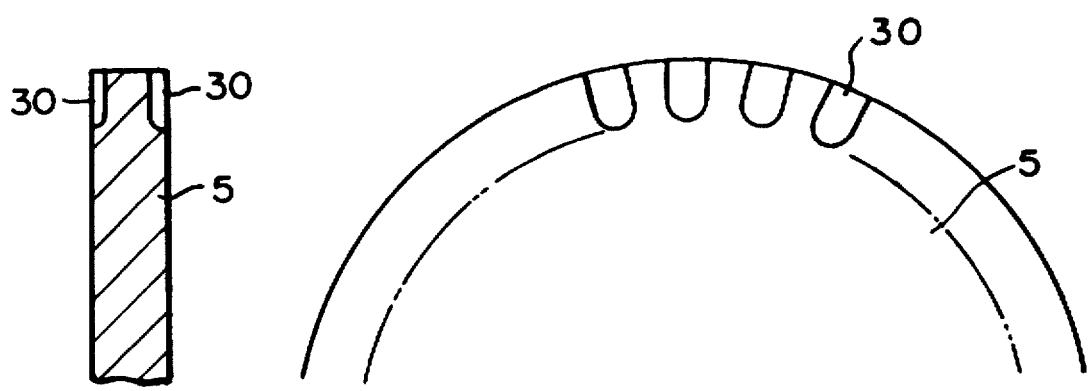
Figure 20:
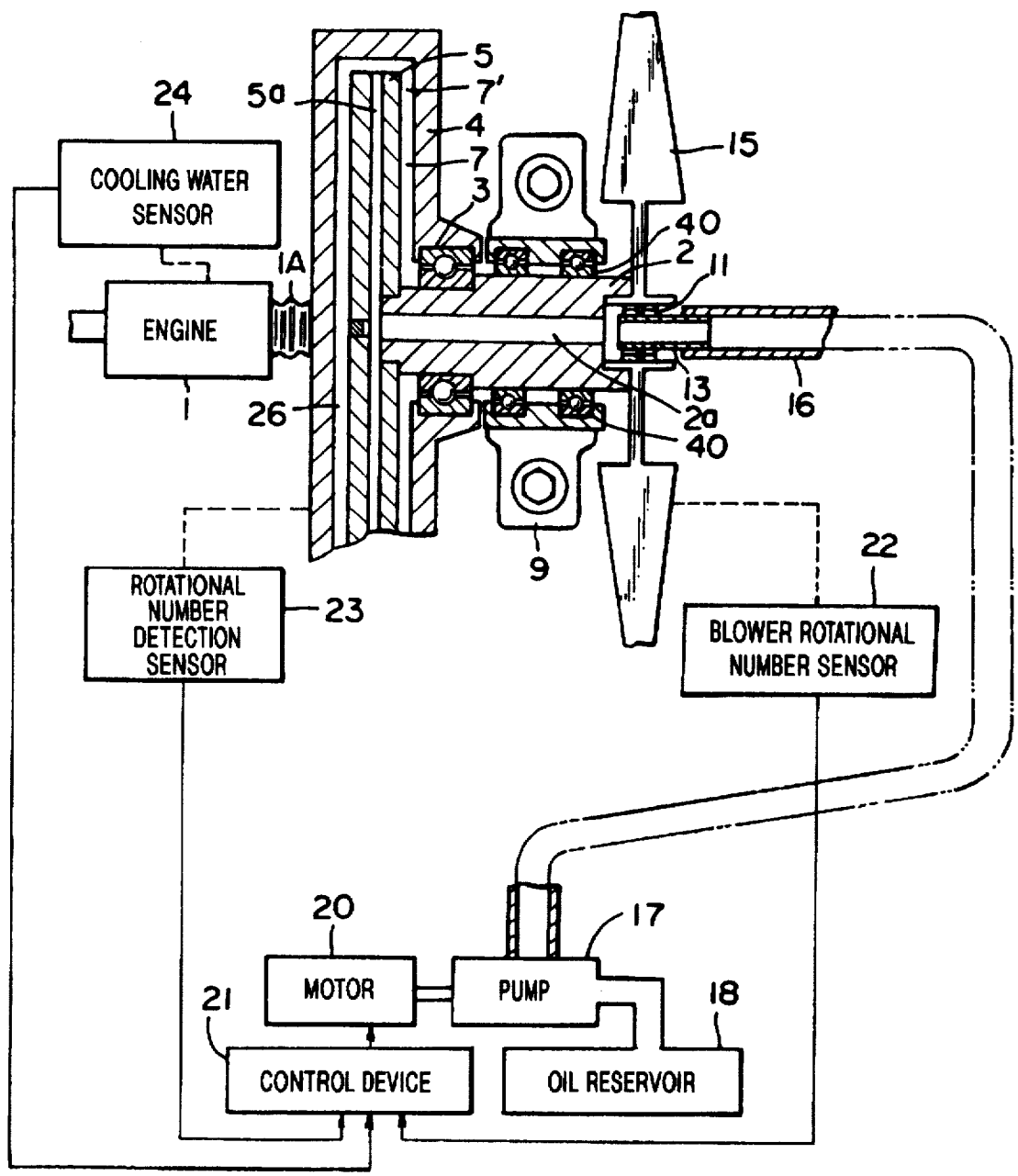
Figure 21:
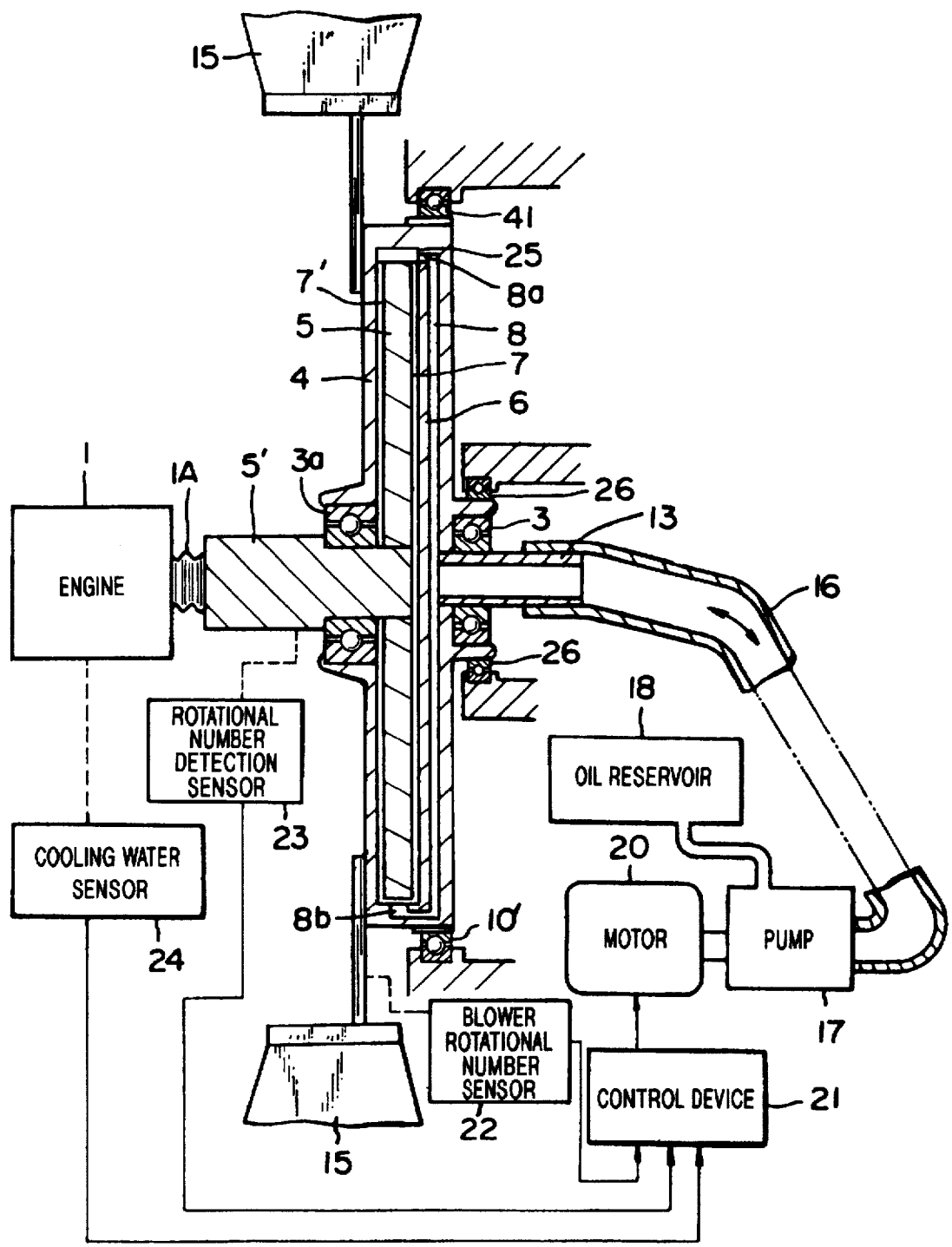

FIGS. 15(a) and 15(b) are explanatory views illustrating a sixth modified embodiment of a pumping mechanism in the third embodiment according to the present invention;

FIGS. 16(a) and 16(b) are explanatory views illustrating a seventh modified embodiment of a pumping mechanism in the third embodiment according to the present invention;

FIGS. 17(a) and 17(b) are explanatory views illustrating a eighth modified embodiment of a pumping mechanism in the third embodiment according to the present invention;

FIGS. 18(a) and 18(b) are explanatory views illustrating a ninth modified embodiment of a pumping mechanism in the third embodiment according to the present invention;

FIG. 19 is an explanatory view illustrating the operation of the fourth embodiment according to the present invention;

FIG. 20 is an explanatory view illustrating a constitution of a fifth embodiment according to the present invention;

FIG. 21 is an explanatory view illustrating a constitution of a sixth embodiment according to the present invention.

PREFERRED EMBODIMENT OF THE INVENTION

Description will now be made to preferred embodiments of the present invention with reference to the drawings.

Figure 1:
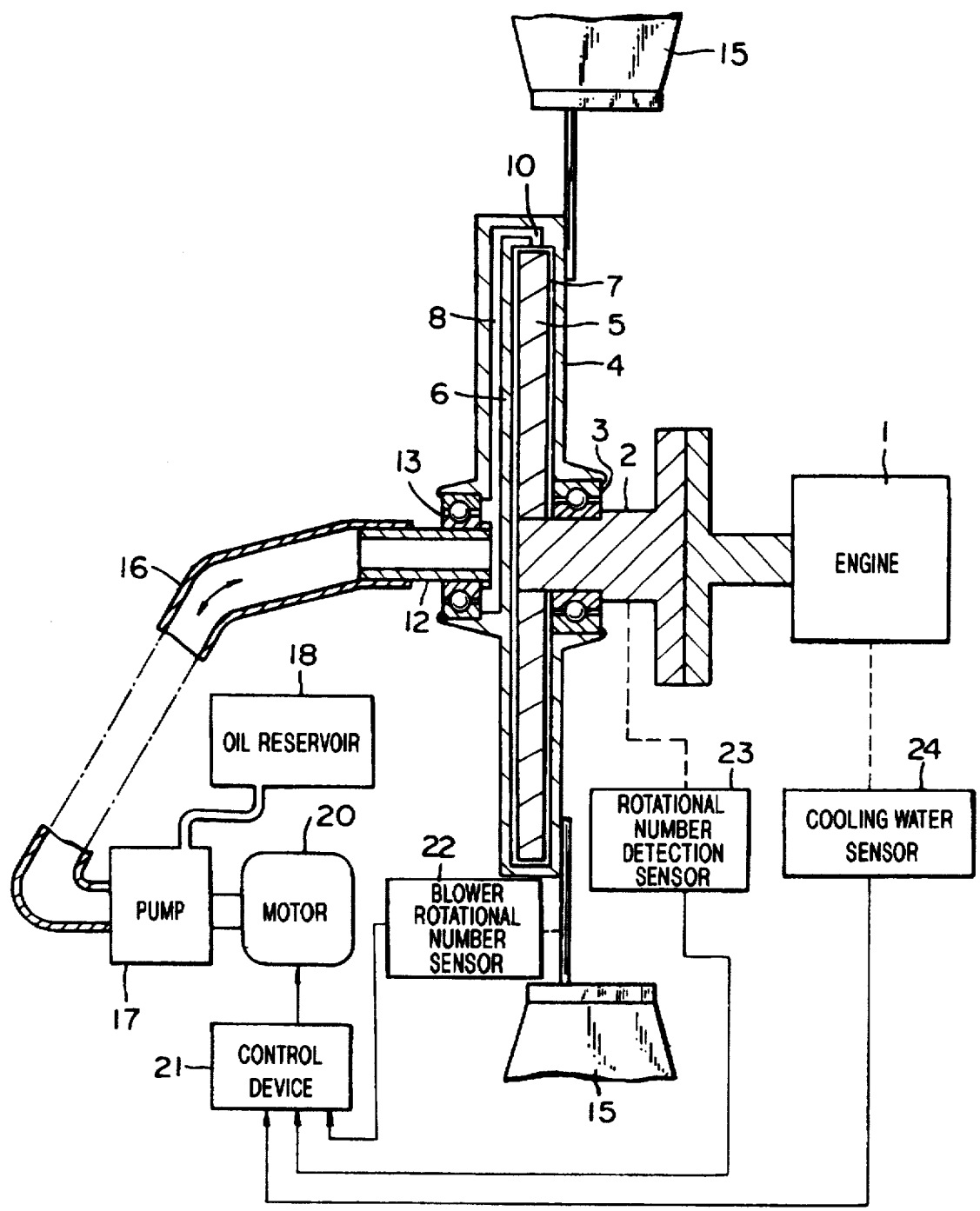

Referring at first to a first embodiment, FIG. 1 is an explanatory view illustrating the constitution of the embodiment, in which a rotational shaft 2 rotationally driven by an engine 1 as a driving section has a cylindrical casing 4 mounted rotatably by way of bearings 3 around the axial center of the rotational shaft 2 as the center of rotation. A disc-like driving disc 5 is secured to one end of the rotational shaft 2 inserted in the casing 4.

The inside of the casing 4 is bisected with a partition wall 6 into a torque transmission chamber 7 and an oil supply section 8, in which the torque transmission chamber 7 and the oil supply section 8 are in communication with each other by way of a communication channel 10. The driving disc 5 situates at the inside of the torque transmission chamber 7 to define a torque transmission gap between the outer circumferential surface and sides of the driving disc and the inner circumferential surface and sides of the torque transmission chamber 7 opposing thereto. A take-out pipe 12 is attached to the oil supply section 8 at the front surface of the casing 4 and the casing 4 is rotatably mounted by way of bearings 13 to the take-out pipe 12. In this way, the casing 4 is mounted rotatably by way of the bearings 3 and 13 around each of the axial centers for the rotational shaft 2 and the take-out pipe 12 as the center of rotation, and a blower 15 is secured to the casing 4.

An oil supply pipe 16 is secured at its one end of the take-out pipe 12 and connected at its other end by way of a pump 17 to an oil reservoir 18, in which a silicone oil is stored. The pump 17 is driven by a motor 20 and it has a function of supplying the silicone oil from the oil reservoir 18 by way of the oil supply pipe 16 into the casing 4 or returning the silicone oil from the inside of the casing 4 by way of the oil supply pipe 16 to the oil reservoir 18. The rotation of the motor 20 is controlled by a control signal from a control device 21, and the control device 21 receives detection signals from a blower rotational number sensor 22 that detects the number of rotation of the blower 15, a rotational shaft of rotational number detection sensor 23 for detecting the number of rotation of the rotational shaft 2, and a cooling water sensor 24 for detecting the temperature of cooling water to the engine 1.

Figure 2:
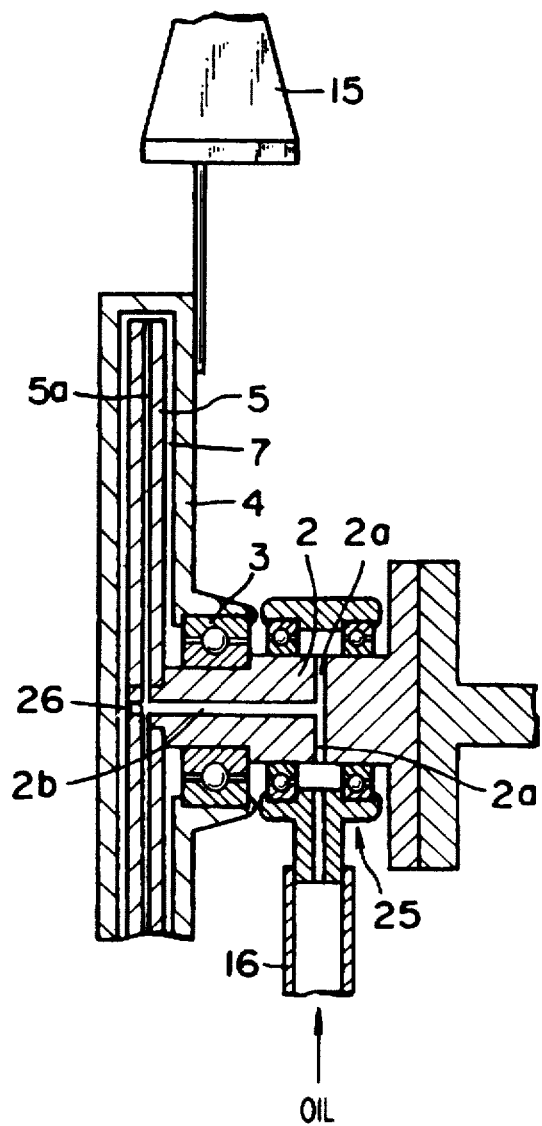
FIG. 2 is an explanatory view illustrating a modified constitution of a first embodiment according to the present invention.

The present invention is not restricted to the above-mentioned embodiment but the oil supply pipe 16 may be connected on the side of the rotational shaft 2 as shown in FIG. 2.

That is, a swivel joint 25 is disposed to the rotational shaft 2, and the oil supply pipe 16 is connected with the swivel joint 25.

In the rotational shaft 2, a plurality of oil channels 2a, 2a, - - - are formed radially and an oil channel 2b in communication with the radial channels are perforated in the axial center. Further, at least one through hole 5a is formed in communication with the oil channel 2b, radially penetrating the driving disc 5 and opened to the outer circumferential surface thereof. Other constitutions are the same as those in FIG. 1. A plug 26 is disposed for closing the end of the oil channel 2b.

Description will now be made to the operation of the embodiment having the constitution as shown in FIG. 1 and FIG. 2 with reference to the drawings.

Figure 3:
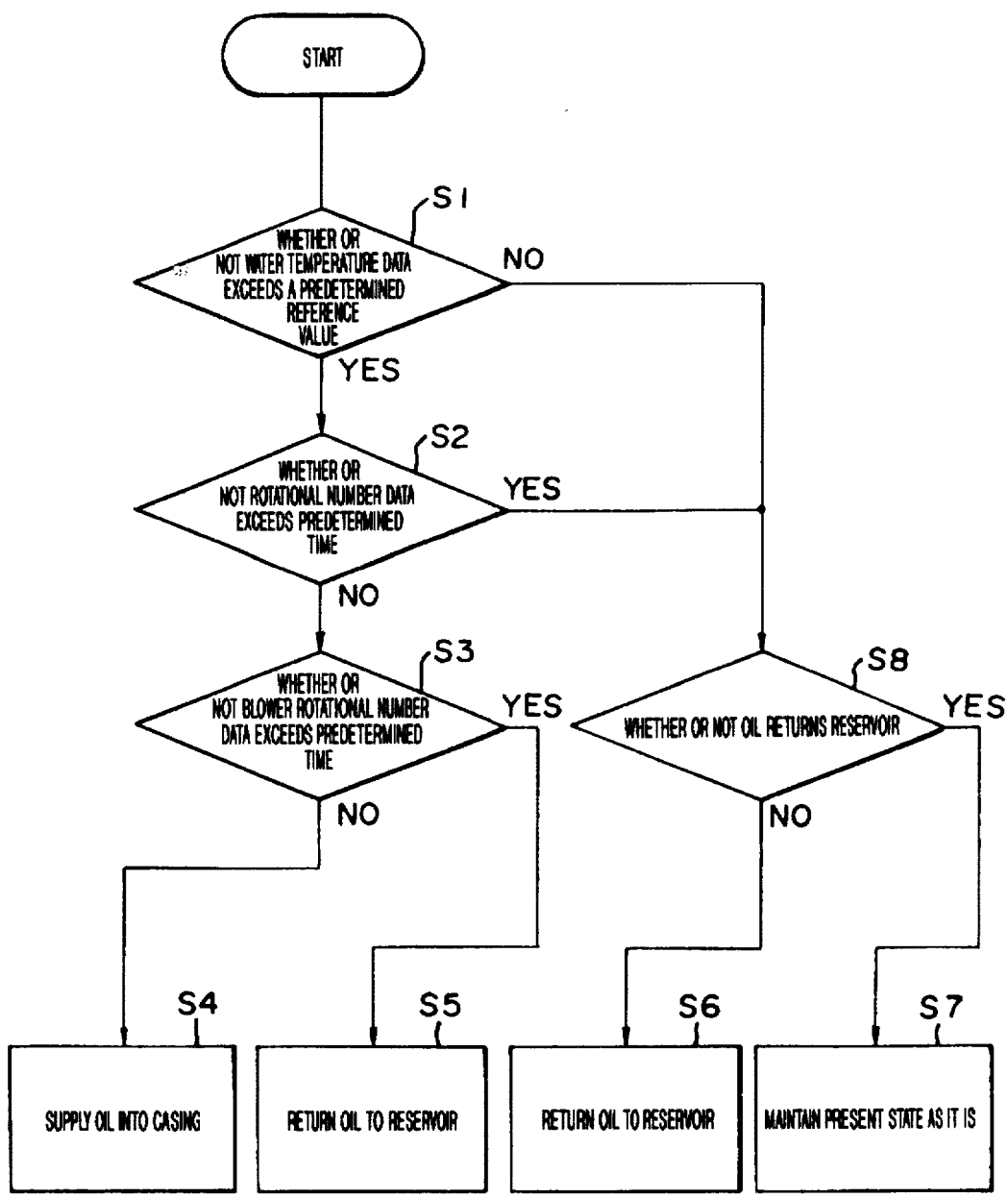
FIG. 3 is a flow chart illustrating the operation of the first embodiment according to the present invention.

FIG. 3 is a flow chart for the operation of this embodiment, FIG. 4 is a characteristic diagram for the operation of the embodiment and FIG. 5 is a characteristic diagram illustrating a relation between the number of rotations of the input shaft and the number of rotations of the blower in this embodiment.

In this embodiment, detection data from the cooling water sensor 24, the rotational number sensor 23 and the blower rotational number sensor 22 are inputted into the control device 21 on every predetermined interval of time, and read into a memory of the control device 21. At step S1 in FIG. 3, comparison is made between the water temperature data at present inputted from the cooling water sensor 24 and the water temperature data at a predetermined time before to judge whether or not the difference between both of the data exceeds a predetermined reference value. In this judgment, an allowable upper limit value and an allowable lower limit value for the cooling water to the engine 1 are referred to for the judgment.

If the result of the judgment at the step S1 is YES, the process proceeds to a step S2, in which comparison is made between the rotational number data at present inputted from the rotational number sensor 23 and the rotational number data at a predetermined time before and it is judged whether or not the situation in a rapid acceleration state. If the judgment at the step S2 is NO, the process proceeds to a step S3, in which comparison is made between the blower rotational number data at present inputted from the blower rotational number sensor 22 and the rotational number data at a predetermined time before and it is judged whether or not the difference between both of the data exceeds a predetermined reference value.

If the judgment at the step 3 is NO, the process proceeds to a step S4, in which the pump 17 is driven by the motor 20 that operates by the control signal from the control device 21, and the silicon oil in the oil reservoir 18 is supplied by way of the oil supply pipe 16 to the inside of the casing. Further, if the judgment at the step S3 is YES, the process proceeds to the step S5, in which the pump 17 is driven by the motor 20 operated by the control signal from the control device 21 to return the silicon oil in the casing 4 by way of the oil supply pipe 16 to the inside of the oil reservoir.

The amount of the silicon oil supplied from the oil reservoir 18 to the inside of the casing or the amount of the silicon oil returned from the inside of the casing 4 to the oil reservoir 18 is set based on the detection data from the cooling water sensor 24, the rotational number sensor 23 and the blower rotational number sensor 22.

If the judgment at the step S1 is NO or the judgment at the step S2 is YES, the process proceeds to a step S8 in which the judgment is made by the control device 21 whether or not the silicon oil is returned from the case 4 to the oil reservoir 18. Then, if the judgment at the step S8 is YES, the process proceeds to a step S7 to maintain the state as it is. If the judgment at the step S8 is NO, the process proceeds to a step S6, in which the pump 17 is driven being switched such that the silicon oil is returned from the casing 4 to the oil reservoir 18 by the control signal from the control device 21.

The operation period of returning the silicon oil at the step S7, or the amount of the silicon oil supplied to the casing 4 at the step S6 is determined based on the detection data from the cooling water sensor 24, rotational number sensor 23 and the blower rotational number sensor 22.

In this embodiment, as shown in FIG. 4, if the temperature elevation rate of the cooling water is large near the upper limit value for the temperature of the cooling water to the engine 1, the number of rotation of the blower is increased. On the other hand, if when the temperature of the cooling water is lowered, the number of the rotation of the blower is decreased. Further, if the number of rotation of the rotational shaft 2 is abruptly increased, the blower is controlled so as to decrease the number of rotation as shown by the dotted line to provide a reducing effect for the number of rotation of the blower as shown by the hatched line.

Further, in the rotational characteristic of the rotational shaft 2 and the blower 15 shown in FIG. 5, if the temperature of the cooling water to the engine 1 is in a usual state of temperature, control is conducted in the region B, whereas the control is conducted in the region A if the temperature of the cooling water exceeds the upper limit value.

With such control, the amount of the silicon oil in the casing 4 is changed at a high accuracy and over a wide range by supplying the silicon oil from the oil reservoir 18 to the inside of the casing 4, or returning the silicon oil from the inside of the casing 4 to the oil reservoir 18.

Accordingly, an appropriate amount of the silicon oil corresponding to the temperature of the cooling water to the engine 1, the number of rotation of the rotational shaft 2 (in proportion with the rotational number of the engine 1) and the number of rotation of the blower 15 is supplied from the communication channel 10 or the through hole 5a to the inside of the torque transmission chamber 7, or the silicon oil is withdrawn from the transmission chamber 7 through the communication channel 10 or the through hole 5a such that the amount of the silicon oil in the transmission chamber 7 is made appropriate. Then, the torque of the driving disc 5 is transmitted by way of the appropriate amount of the silicon oil in the transmission chamber 7 to the casing to rotate the blower 15.

In this way, the number of rotation of the blower 15 is controlled such that it does not changes greatly as shown in FIG. 4 by causing the silicon oil to be present in the transmission chamber 7 by such an amount as optimum to the temperature of the cooling water to the engine 1, the rotational number of the engine 1 and the rotational number of the blower 15. The temperature of the cooling water to the engine 1 is also kept substantially constant, the control is conducted under an optimum condition adaptable also to the cold starting and running on a high way, the noise of the blower 15 is lowered and wasteful fuel consumption can be prevented.

Although explanations have been made in this embodiment such that the amount of the oil in the casing is controlled based on the temperature of the cooling water to the engine, the number of rotation of the engine and the number of the rotation of the blower, the present invention is not restricted only to such an embodiment. For instance, control factors may also include other additional factors such as amount of air stream caused by running, atmospheric temperature, temperature for intake air, vehicle speed, throttle opening degree, atmospheric pressure, absence or presence of knocking, condition of air conditioner, state of exhaust brake, etc.

Figure 6:
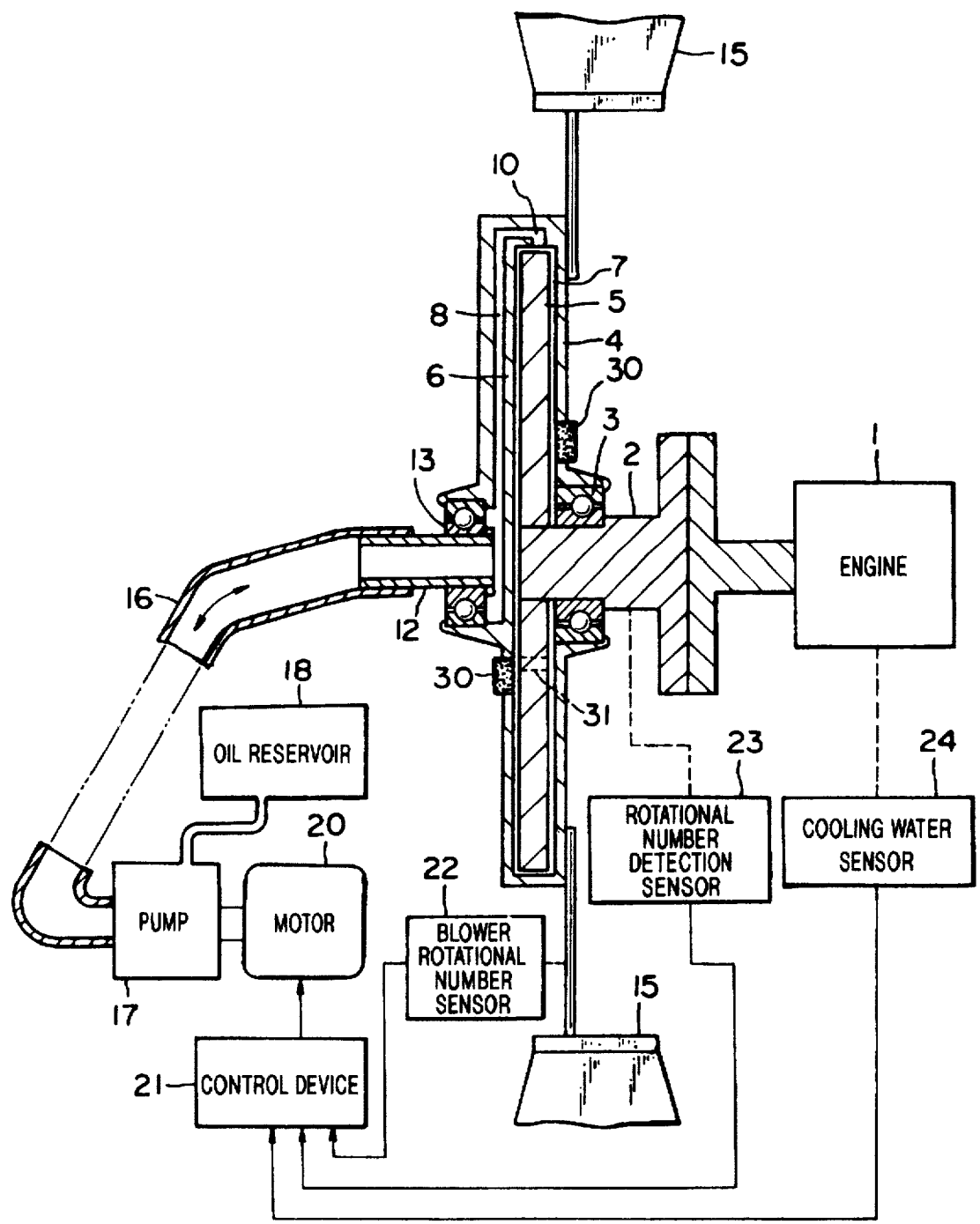
FIG. 6 is an explanatory view illustrating a constitution of a second embodiment according to the present invention.
Figure 7:
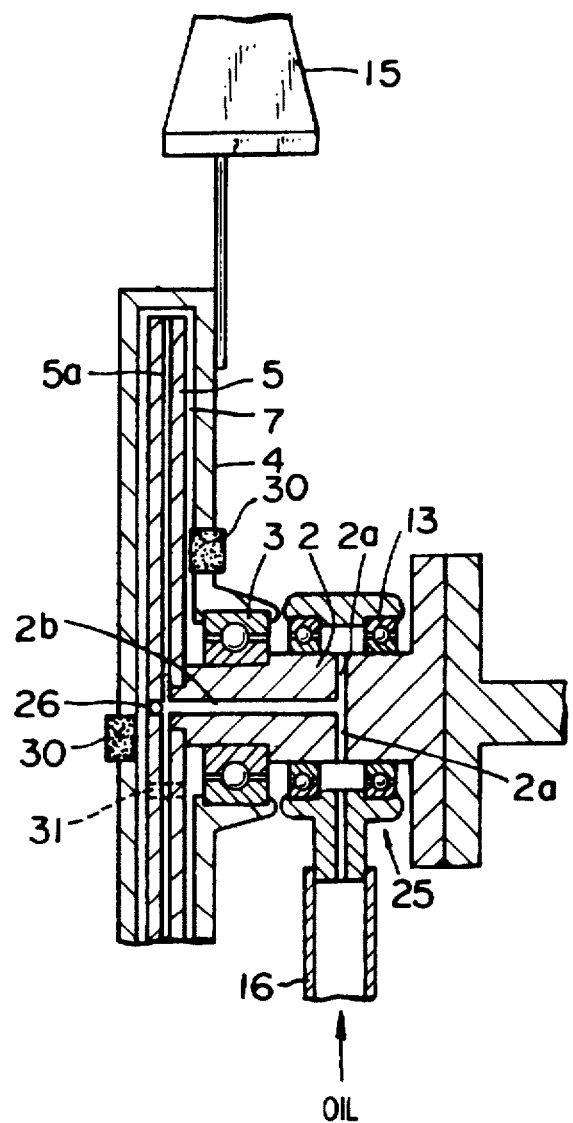
FIG. 7 is an explanatory view illustrating a modified constitution of a second embodiment according to the present invention.

Description will now be made to a second embodiment according to the present invention with reference to FIGS. 6 and 7.

The second embodiment is substantially identical with the first embodiment previously described with reference to FIG. 1 and it further includes an additional constitution described below.

A breather 30 is disposed passing through the casing 4 in the torque transmission chamber 7. The breather 30 is adapted such that when the pressure in the torque transmission chamber 7 increases in excess of a predetermined upper limit value, only the gas in the torque transmission chamber 7 is released through the breather 30 out of the casing 4, and such that when the pressure in the torque transmission chamber 7 is lowers to less than the predetermined lower limit value, atmospheric air flows through the breather 30 into the torque transmission chamber 7.

The breather 30 is preferably disposed, as in the illustrated embodiment, both on the front and the rear sides of the casing 4, but it may suffice to dispose the breezer at least on the side opposite to the side disposed with the oil supply pipe 16. If an air vent hole 31 is disposed passing through the driving disc 5 near the axial center thereof, the silicon oil can enter and emit more smoothly by way of the oil supply pipe 16.

The present invention is not restricted to the foregoing embodiment but the oil supply pipe 16 may be connected on the side of the rotational shaft 2. (corresponding to the constitution of FIG. 2)

Other constitutions of the second embodiment are identical with those in the first embodiment previously described.

In the second embodiment, when the pressure in the torque transmission chamber 7 increases beyond the predetermined upper limit value, the gas in the torque transmission chamber 7 is released through the breezer 30 to the outside of the casing 4 and, accordingly, the oil can enter and emit smoothly.

Further, if the pressure in the torque transmission chamber 7 is lowered to less than the predetermined lower limit value, since the external air inflows through the breezer 30 into the torque transmission chamber 7, a negative pressure is not formed in the torque transmission chamber 7 and the oil can be delivered smoothly.

Other operations and effects of the second embodiment are identical with those of the first embodiment described previously.

Description will now be made to a third embodiment according to the present invention with reference to the FIG. 8 through FIG. 18.

Figure 8:
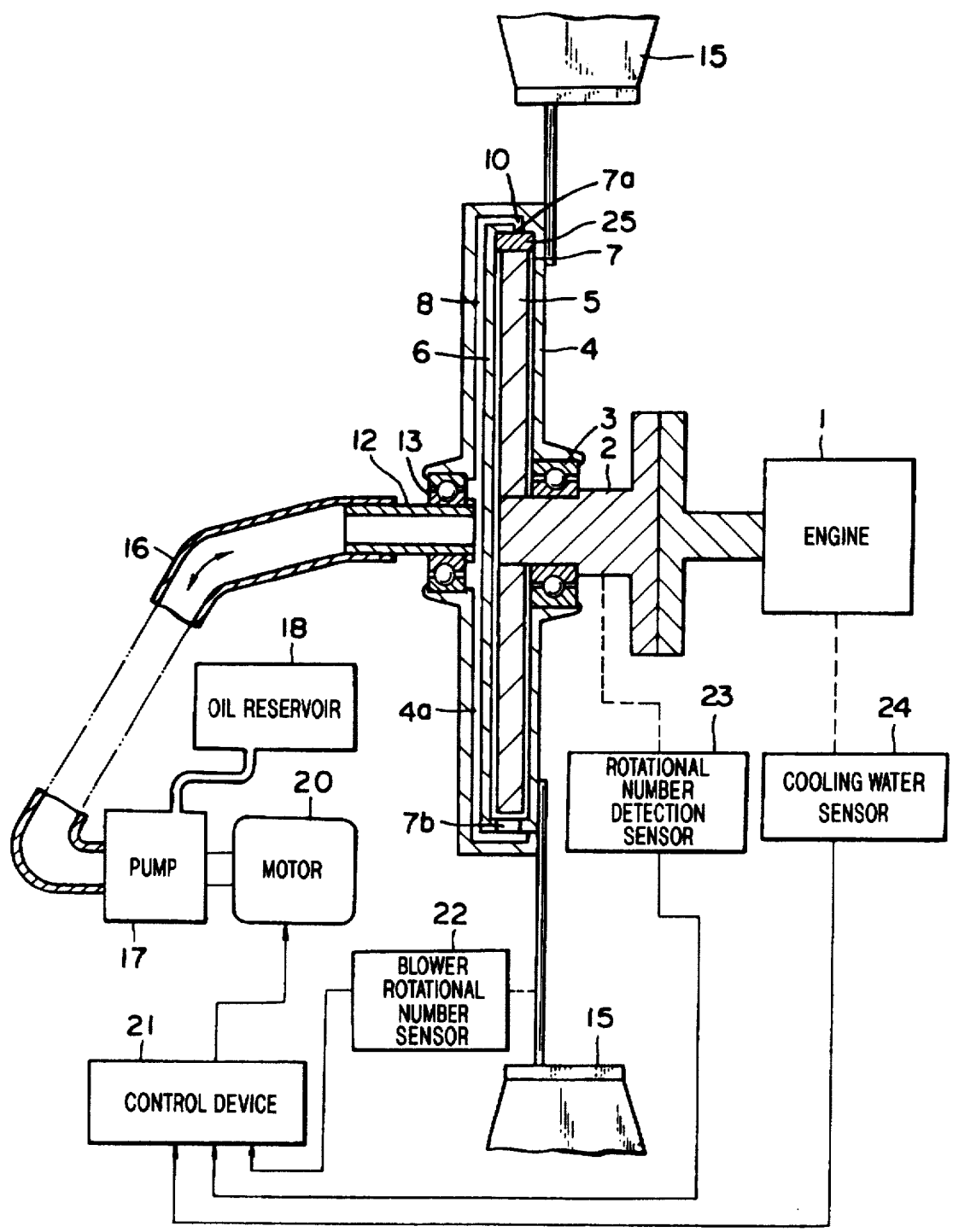
FIG. 8 is an explanatory view illustrating a constitution of a third embodiment according to the present invention.

In the third embodiment, as shown in FIG. 8, a dam 25 as a pumping mechanism is disposed on the inner circumferential wall of the casing 4 at a position of an oil supply port 7a for communicating a communication channel 10 with a torque transmission chamber 7, and the dam 25 pumps the oil from the side of the torque transmission chamber 7 to the side of an oil supply channel 8. A take-out pipe 12 is attached to the central portion of the oil supply channel 8 and a casing 4 is rotatably attached by way of bearings 13 to the take-out pipe 12. In this way, the casing 4 is rotatably attached by way of bearings 3, 13 to each of the axial centers of a rotational shaft 2 and the take-out pipe 12 as the center of rotation, and a blower 15 as a member to be driven is secured to the casing 4.

On the other hand, an oil supply port 7b is disposed to a position on the inner circumferential wall of the casing 4 at a position preferably opposed substantially to the oil supply port 7a, and an oil supply channel 4a is formed between the oil supply port 7b and the take-out pipe 12 of the casing 4.

Other constitutions of the third embodiment are identical with those of the first embodiment previously described.

Figure 9:
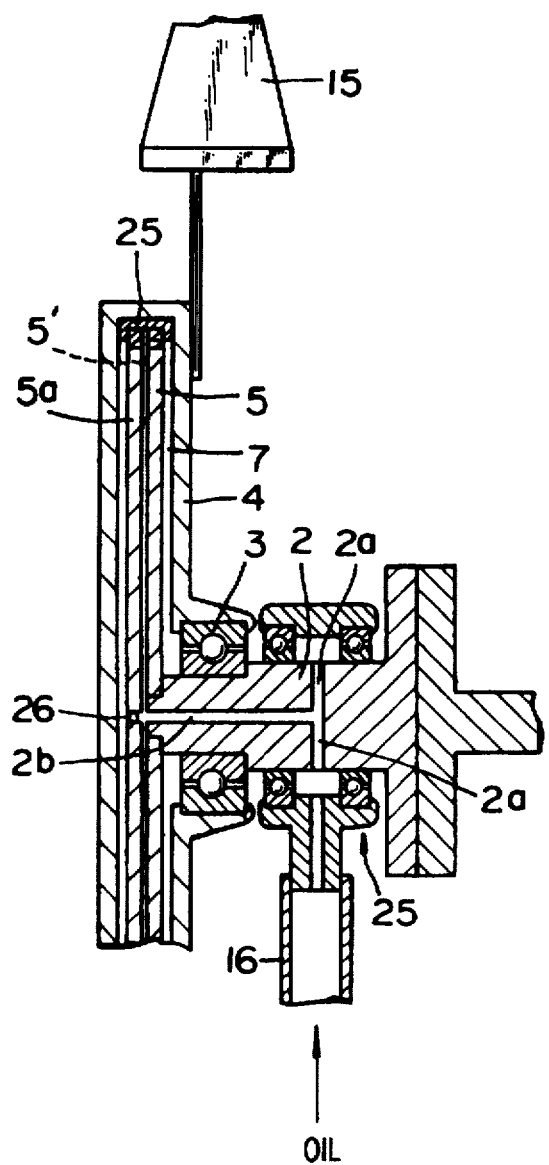
FIG. 9 is an explanatory view illustrating a modified constitution of a third embodiment according to the present invention.

Further, the present invention is not restricted to the above-mentioned embodiment but the oil supply pipe 16 may be connected on the side of a rotational shaft 2 as shown in FIG. 9 (corresponding to FIG. 2).

In this case, a recess 5' is disposed to the outer circumferential wall of a driving disc 5 on the rear side of a through hole 5a in the rotational direction and a dam 25 is loosely attached to the recess 5'. Other constitutions are the same as those shown in FIG. 8. A plug 28 is disposed for closing the end of an oil channel 2b.

In the present invention, the embodiment shown in FIG. 8 and the embodiment shown in FIG. 9 may be combined. That is, it may be constituted such that the oil supply pipe 16 is connected to the side of the casing and the side of the rotational shaft 2 and the oil is supplied to or delivered from the torque transmission chamber by the pump 17, or the oil is supplied from the side of the rotational shaft 2 and delivered from the side of the casing 4 or, on the contrary, the oil is supplied on the side of the casing 4 and delivered from the side of the rotational shaft 2.

In the operation of the third embodiment, the pump 17 is driven by the motor 20 that is actuated by control signals from the control device 22 at the step S5 in the flow chart of FIG. 3, and the silicon oil in the casing 4 is pumped by the damp 25 and returned by way of the oil supply channel 8 and the oil supply pipe 16 to the oil reservoir 18.

In this case, the suction performance of the pump 17 is increased by the pumping effect of the dam 25 disposed between the oil support port 7a and the driving disc 5, and the silicon oil in the casing 4 is returned smoothly and rapidly into the oil reservoir 18.

In the third embodiment, with respect to the rotational characteristics of the rotational shaft 2 and the blower 15 shown in FIG. 5, the temperature of the cooling water to the engine 1 is controlled in the region B in the usual state of temperature but, if the temperature of the cooling water exceeds the upper limit value, the control is conducted in the region A, in the same manner as in the first embodiment.

In this case, since the dam 25 having the pumping function is disposed between the oil supply port 7a and the driving disc 5, the silicon oil in the casing 4 is returned smoothly and rapidly to the oil reservoir 18.

On the other hand, the silicon oil is delivered from the oil reservoir 18 to the casing 4 through the oil supply channel 8, and this can be made more smoothly by additionally providing at least one oil supply channel 4a and oil supply port 7a.

Other operations and effects of the third embodiment are the same as those of the first embodiment previously described above.

Figure 10A:
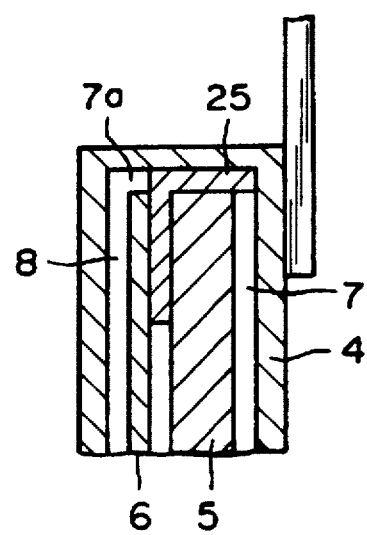
FIG. 10a–10c are explanatory views illustrating a first modified embodiment of a pumping mechanism in the third embodiment according to the present invention.
Figure 10B:
Figure 10C:

In the above-mentioned embodiment, the dam 25 illustrated as an example of the pumping system is disposed near the oil supply port 7a on the circumferential wall of the casing 4. However, for further improving the pumping function, the dam 25 may be formed into a generally L-shaped cross sectional configuration as shown in FIG. 10(a), (b), or into a generally U-shaped cross sectional configuration as shown in FIG. 10(c). Further, the oil supply port 7a is disposed to the side on the outer circumference of the casing 4 in this modified embodiment.

Explanation will be made to other embodiments in which the dam as the pumping mechanism is loosely attached to the recess 5' disposed in the driving disc 5 with reference to FIG. 11 through FIG. 14.

Figure 11A:
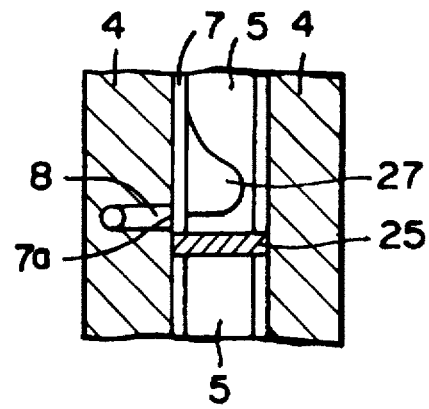
FIG. 11a–11c are explanatory views illustrating a second modified embodiment of a pumping mechanism in the third embodiment according to the present invention.
Figure 11B:
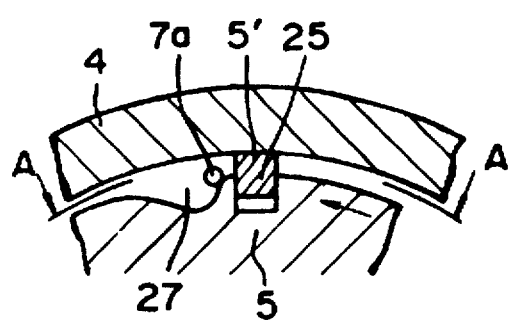
Figure 11C:
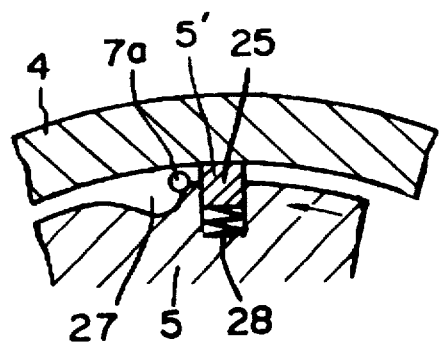

A recess 27 is disposed to the outer circumferential wall of a driving disc 5 on this side of a dam 25, which serves to pressurize the oil collected by the dam 25 to be more effectively supplied to an oil supply port 7a. As shown in FIG. 11(b), if the side of the oil supply port 7a is opened, while the axial opposite side is closed, the pressurizing effect for the oil to the oil supply port 7a disposed on the side of the casing 4 is further improved. The dam 25 is always brought into an intimate contact with the opposing inner circumferential wall surface of the casing 4 upon rotational driving due to the centrifugal force and/or tension with a spring 28.

Figure 12:
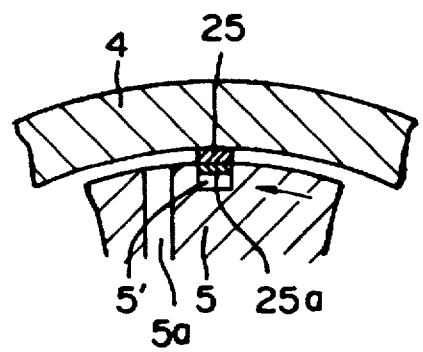
FIG. 12 is an explanatory view illustrating a third modified embodiment of a pumping mechanism in the third embodiment according to the present invention.
Figure 13:
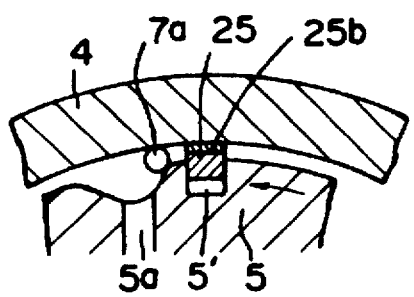
FIG. 13 is an explanatory view illustrating a fourth modified embodiment of a pumping mechanism in the third embodiment according to the present invention.

Further, such dams 25 may be formed at a plurality of positions on the outer circumferential wall surface of the driving disc 5, as necessary, and the oil supply ports 7a may be disposed in plurality. Further, for improving the effect of the centrifugal force, the dam 25 may be provided with a weight 25a as shown in FIG. 12, or the dam itself may be formed as a weight. It is particularly effective in a case, shown in FIG. 9, where the oil supply pipe 16 is connected on the side of the rotational shaft 2 and the oil is supplied or delivered through the through hole 5a to the driving disc 5 as shown in FIG. 9. Further, if a sliding member 25b is disposed on the side in sliding contact with the inner circumferential wall surface of the casing 3 as shown in FIG. 13, it is particularly effective in a case of combining the embodiments shown in FIG. 8 and FIG. 9 together, that is, in a case where the through hole 5a is disposed to the driving disc 5, while the oil supply port 7a is disposed on the side of the casing 4 in order to simultaneously supply and deliver the oil on the side of the rotational shaft 2 and the side of the casing 4.

Figure 14:
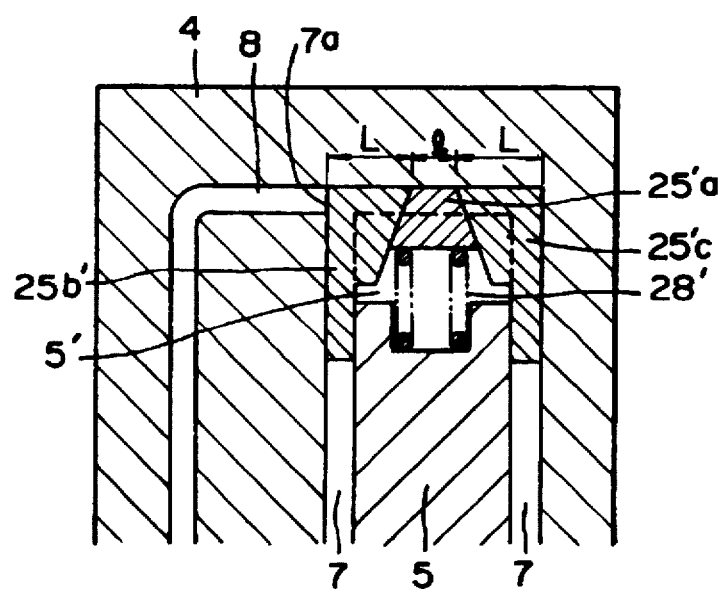
FIG. 14 is an explanatory view illustrating a fifth modified embodiment of a pumping mechanism in the third embodiment according to the present invention.

Further, the dam 25 may be constituted, as shown in FIG. 14, with three divided pieces, in which the both sides of a central piece 25'a are formed each as a tapered surface converging toward the outside, and each one surface of both of the side members 25'b, 25'c is formed into such a tapered surface as substantially mating the tapered surface of the central piece 25'a. That is, by setting the outer width (l) for each of the side pieces 25'b, 25'c and the other width (L) for the outer side of the central piece 25'a into a relation: (L)>(l), if abrasion is caused due to the friction between the central piece 25'a and the side pieces 25'b, 25'c with the inner circumferential wall surface of the casing 4, the central piece 25'a is abraded preferentially thereby always obtaining a constant sealing effect due to the edge effect by the tapered surface of the central piece 25'a. 28' denotes a spring for outerward biasing the central piece 25'a, which may be replaced with a weight as shown in FIG. 12.

Further, the pumping mechanism is not restricted only to that in the embodiment described above but it may be modified, for example, such that a plurality of gear teeth 29 such as of spur or bevel gear are disposed to the outer circumferential such wall of the driving disc 5 as shown in FIG. 15(a), (b) or such that a plurality of recessed grooves 30 each extended radially are formed at least on one side to the outer circumferential portion of the driving disc 5 as shown in FIG. 16(a), (b) or such that fins 31 are disposed as shown in FIG. 17(a), (b). Further, the pumping effect can also be attained by forming recessed grooves 32 extended in the radial direction at least to one inner sides on the outer circumference of the casing 4 as shown in FIG. 18(a), (b).

Further, the pumping mechanism can also be attained by properly combining the gears 29, dam 25, fins 31, recessed grooves 30, 32 described above.

As described above, the oil can be delivered extremely smoothly from the torque transmission chamber 7 by disposing various kinds of pumping mechanisms, as well as the oil can be supplied extremely smoothly to the torque transmission chamber 7 by separately disposing the oil supply channel 4a and the oil supply port 7b, so that the volume of the pump 17 and the motor 20 for driving the pump 17 can be reduced.

Description will now be made to the fourth embodiment.

The fourth embodiment comprises a data calculation or means using at least the number of rotation of the blower, the number of rotation of the rotational shaft and the temperature of cooling water to the cooling device as control signals and calculating control data regarding the control of the oil supply means and based on these signals. This embodiment is adapted so that the oil supply means is driven based on the control data obtained from the data calculation means.

Other constitutions of the fourth embodiment are the same as those of the first embodiment described previously.

FIG. 19 is an explanatory view for the control operation of the fourth embodiment. In this fourth embodiment, a blower velocity signal Nf for the number of rotation of the blower, an engine velocity signal Ne for the number of cooling device are inputted as control signals S to a control device 21. In a characteristic data calculation circuit of the control device 21, blower velocity—engine velocity characteristic data (A), blower velocity—cooling water temperature characteristic data (B) and engine velocity—time characteristic data (C) shown in FIG. 19(D) are calculated as the characteristic data based on the above-mentioned control signals.

Control data are calculated based on the characteristic data (D) ((A), (B), (C)) and the control signals S (Ne, Tw, Nf) in the control data calculation circuit of the control device 21, and the motor 20 is controlled based on the resultant control data to control the supply or delivery operation of the oil. That is, at a step S11 in FIG. 19, it is judged whether or not the engine is in an accelerated state based on the engine velocity signal Ne and the engine velocity—time characteristic data (C) according to the conditional relation: dNe/dt>dne/dt. If the judgment made at the step S11 is YES, the process proceeds to the step S12, in which the blower velocity Nf is set to the minimum blower velocity Noff as: Nf=Noff and then the process proceeds to a step S15. Depending on the demanded characteristics of a vehicle, it may also be adapted, for example, as below. That is, if the judgment made at the step S11 is NO, the process is proceeded to the step S12 during maintenance of a high number of rotation of the engine during acceleration upon starting and/or after acceleration, or the process is maintained at the step 12 for a predetermined period of time after the issue of Noff signal. Alternatively, even if the judgment made at the step S11 is YES, the process may be returned to the step S13 while the temperature of the cooling water is excessively high and/or the air conditioner is in the ON state and the number of rotation of the engine is relatively low. Further, the process may be proceeded to a step S15 setting as Nf=Non. Then, at the step S15, control is determined based on the comparison between the blower velocity signal Nf and the inputted blower calculation velocity signal velocity Nf and, depending on the judgment made at the step S15, current is supplied at a step S16 to the motor 20.

If the judgment made at the step S11 is NO, the process is proceeded to the step S13 in which the maximum blower velocity Non and the minimum blower velocity Noff are calculated and then the process is proceeded to a step S14 in which the blower calculation velocity is calculated by nf=f (Noff, Non, Tw, T₁, T₂). For instance, in a case of controlling the blower velocity relative to the temperature of the cooling water in a linear system, calculation is carried out according to:

$$nf=Noff+(Non-Noff) \times Tw-T_1/T_2-T_1$$

Then, the process is proceeded to the step S15, in which control is determined based on the comparison between the resultant calculated blower velocity nf and the inputted blower velocity signal Nf and, according to the judgment at the step S15, current is supplied to the motor 20 at the step S16.

Other operations and effects of the fourth embodiment are the same as those of the first embodiment previously described.

Description will now be made to a fifth embodiment with reference to FIGS. 20 and 21.

As shown in FIG. 20, a disc-shaped disc 5 is secured to one end of a rotational shaft 2, and a blower 15 is secured to the other end of the shaft. A cylindrical casing 4 of a short length and a large diameter is rotatably attached, with the disc 5 being incorporated at its inside, to the rotational shaft 2 by way of bearings 3. The rotational shaft 2 is supported substantially at its middle portion by way of bearings 40 disposed in a bracket 9 to a stationary portion such as a car body or an engine block. An oil channel 2a axially passing through the rotational shaft 2 is formed at the axial center of the rotational shaft 2 in communication with the end face on the side of the disc 5, and the other end of the oil channel 2a is closed by a plug 26. The outer end of the oil channel 2a is in communication by way of bearings 11 and through a take-out pipe 13 with an oil supply pipe 16. At least one through hole 5a in communication with the oil channel 2a is disposed to the disc 5 such that the outer circumferential surface is opened to the torque transmission chamber 7, and a torque transmission gap 7' is formed between the outer circumferential surface of the disc 5 and the inner circumferential surface of the casing 4 opposed to the outer circumferential surface of the disc. Furthermore, a rotational shaft of an engine 1 as a driving section is connected by means of a flexible joint 1A comprising a torque pipe, a spiral spring and a slitted hollow shaft to the casing 4.

A pump 17 driven by a motor 20 is connected to the oil supply pipe 16, and the pump 17 is connected to an oil reservoir 18 accumulating a silicone oil. There are attached a cooling water temperature sensor 24 for detecting the temperature of cooling water for the engine 1 to the engine 1, a rotational number sensor for detecting the number of rotation of the casing 4 to the casing 4 and a blower rotational number sensor 22 for detecting the number of rotation of the blower 15 to the blower 15 respectively. Respective output terminals for the cooling water temperature sensor 24, the rotational number sensor 23 and the blower rotational number sensor 22 are connected to a control device 21 for controlling the rotation of the motor 20.

With such a constitution, the rotation of the engine 1 is transmitted by way of the flexible joint 1A to the casing 4 with no impact shocks, stably and with no vibrations to rotate the casing 4 by way of the bearings 3 around the rotational shaft 2 as the center of rotation. On the other hand, the motor 20 is driven under control by the control device 21 that operates by receiving the detection signal from the cooling water temperature sensor 24, the detection signal from the rotational number sensor 23 and the detection signal from the blower rotational number sensor 22. The pump 17 is operated by the rotation of the motor 20 to supply the silicone oil in the oil reservoir 18 by way of the oil supply pipe 16, the take-out pipe 13, the oil channel 2a and the through hole 5a to the torque transmission chamber 7 in the casing 4, or to return the silicone oil in the torque transmission chamber 7 by way of the above-mentioned flow channels into the oil reservoir 18. Then, since the transmission rate of the rotational torque of the casing 4 to the disc 5 is adjusted depending on the amount of the silicone oil in the torque transmission gap 7', the rotational velocity of the blower 15 rotated by the rotation of the disc 5 can always be controlled to a desired value.

The present invention is not restricted only to the embodiment shown in FIG. 20, but it is also applicable to a fluid clutch of a type as shown in FIG. 21, in which driving force of an engine 1 is transmitted to a disc 5 and the transmission torque is transmitted to the casing 4 by way of a torque transmission gap 7' and torque transmission chamber 7.

In FIG. 21, the rotation of the engine 1 is transmitted by way of a flexible joint 1A to a driving shaft 5' to rotate the disc 5 secured at the end. The rotation of the disc 5 is transmitted by means of the silicone oil in the torque transmission gap 7' of the torque transmission chamber 7 to the casing 4. The casing 4 is rotatably supported by way of bearings 41 to the stationary portion such as a car body or an engine block.

The inside of the casing 4 is bisected into a torque transmission chamber 7 and an oil channel 8 by means of a partition wall 6, in which the oil channel 8 is connected by way of a take-out pipe 13 with an oil supply pipe 16, while is in communication at the outer circumferential thereof with channel 8a, 8b and opened to the torque transmission chamber 7. A dam 25 or the like having a pumping function is disposed behind the opening of the communication channel 8a at the inner circumferential surface of the casing 4.

Bearings 3 and 3a are disposed respectively between the take-out pipe 13 and the casing 4 and between the casing 4 and the driving shaft 5', and bearings 26 are disposed for rotatably supporting the casing 4 to the stationary portion, which may be used instead of or together with the bearings 10'.

The operation of the embodiment shown in FIG. 21 is substantially identical with that of the embodiment shown in FIG. 20, in which the silicon oil is supplied to the torque transmission chamber 7 by the pump 17 through the oil channel 8 and the communication channels 8a, 8b while the silicone oil is delivered through the communication channel 8a by the reverse rotation of the pump 17 and the pumping function of the dam 25 or the like. In a case where the pump is not actuated, the silicone oil enters by the dam 25 by way of the communication channel 8a to the oil channel 8 and circulates from the oil channel 8 by way of the communication channel 8b to the torque transmission channel 7.

The operation of the fifth embodiment is the same as the operation of the first embodiment previously described with reference to FIG. 3 through FIG. 5.

In the fifth embodiment, since the casing 4 or the disc 5 is supported on the stationary portion, a flexible joint transmitting only the rotation of the engine 1 can be used and, accordingly, even in a driving transmission by way of direct coupling with the crank shaft of the engine, bearings attached to the rotational shaft 2 are free from direct impact shocks or vibrations upon driving the engine 1, which can extend the operation life and improve the durability of bearings of high manufacturing cost, as well as a problem in view of the production cost can be overcome. Other effects of the fifth embodiment are identical with those of the first embodiment previously described.

As has been described above specifically, according to the present invention, since an oil supplied from an outside to a torque transmission gap defined between a driving disc and a casing is controlled depending on the driving conditions in the driving section, it is possible to transmit the driving torque of the driving disc corresponding to the driving conditions under an optimum transmission state to the casing and to conduct optimum clutch operation under various kinds of driving conditions, so that various advantageous effects can be prevented such as reduction of blower noises, economization of fuels, as well as improvement for the acceleration performance.

Further, in accordance with the present invention, since the disc or the casing is rotatably supported on a stationary portion, burden on bearings attached to the rotational shaft can be moderated and, since the fluid clutch and the engine are connected by means of a flexible joint, bearings do not undergo impact shocks or the vibrations upon driving and the working life can be extended and the entire durability is improved.

What is claimed is:

1. A fluid clutch comprising a driving section, a rotation shaft rotatably driven by said driving section, a driving disc rigidly mounted to and rotationally driven by said rotational shaft, a casing in which said driving disc is incorporated and which is rotatably disposed around said rotational shaft as a center of rotation, such that a torque transmission gap is defined between said driving disc and the casing, and an oil filled in the torque transmission gap defined between said driving disc and the casing for transmitting a driving torque from said driving disc to said casing, wherein a non-rotatable oil supply pipe communicates from a location external of the casing into the casing and wherein an oil supply means is non-rotatably mounted to the portion of the oil supply pipe external of the casing for selectively supplying and returning said oil between the outside and the inside of said casing and for selectively increasing and decreasing the driving torque transmitted from the driving disc to the casing, said casing further including at least one breather extending through said casing between the torque transmission gap and atmospheric air for releasing gas from said torque transmission chamber when pressure in said torque transmission chamber exceeds a predetermined upper limit value and for enabling inflow of atmospheric air to said torque transmission chamber when pressure in the torque transmission chamber is less than a predetermined lower limit value.

2. A fluid clutch comprising a driving section, a rotational shaft rotatably driven by said driving section, a cooling device for cooling said driving section, a driving disc rigidly mounted to and rotationally driven by said rotational shaft, a casing in which said driving disc is incorporated and which is rotatably disposed around said rotational shaft as a center of rotation such that a torque transmission gap is defined between said driving disc and the casing, a blower attached to said casing, and an oil filled in the torque transmission gap defined between said driving disc and the casing for transmitting a driving torque from said driving disc to said casing, wherein the fluid clutch comprises an oil supply means for selectively supplying and returning said oil between the outside and the inside of said casing, and a control means for controlling the supply and return of said oil by said oil supply means at least based on the rate of rotation of said blower, the rate of rotation of said rotational shaft and the temperature of cooling water of said cooling device, said casing further including at least one breather extending through said casing between the torque transmission gap and atmospheric air for releasing gas from said torque transmission chamber when pressure in said torque transmission chamber exceeds a predetermined upper limit value and for enabling inflow of atmospheric air to said torque transmission chamber when pressure in the torque transmission chamber is less than a predetermined lower limit value.

3. A fluid clutch comprising a driving section, a rotational shaft rotatably driven by said driving section, a cooling device for cooling said driving section, a driving disc rigidly mounted to and rotationally driven by said rotational shaft, a casing in which said driving disc is incorporated and which is rotatably disposed around said rotational shaft as a center of rotation such that a torque transmission gap is defined between said driving disc and the casing, a blower attached to said casing, and an oil filled in the torque transmission gap defined between said driving disc and the casing for transmitting a driving torque from said driving disc to said casing, wherein the fluid clutch comprises an oil supply means for selectively supplying and returning said oil by way of an oil supply pipe between the outside and the inside of said casing, a data calculation means for calculating control data using at least the rate of rotation of the blower, the rate of rotation of the rotational shaft and the temperature of the cooling water of the cooling device as control signals and calculating the control data regarding the control for said oil supply means based on said control signal, and a control device for driving said oil supply means based on the control data obtained from the data calculation means, said casing further including at least one breather extending through said casing between the torque transmission gap and atmospheric air for releasing gas from said torque transmission chamber when pressure in said torque transmission chamber exceeds a predetermined upper limit value and for enabling inflow of atmospheric air to said torque transmission chamber when pressure in the torque transmission chamber is less than a predetermined lower limit value.

4. A fluid clutch as in claim 1 further comprising at least two breathers disposed respectively in portions of said housing on opposite sides of said driving disc.

5. A fluid clutch as in claim 1, wherein said drive disc is provided with an air vent hole passing therethrough for providing air communication between portions of said torque transmission gap on opposed sides of said drive disc, said breather being disposed on a side of said casing opposite said oil supply pipe.

* * * * *

UNITED STATES PATENT AND TRADEMARK OFFICE
CERTIFICATE OF CORRECTION

PATENT NO.   : 5,799,765
DATED        : September 1, 1998
INVENTOR(S)  : Yuichi Ono, Mitsuaki Hatori and Hiroshi Inoue It is certified that error appears in the above-identified patent and that said Letters Patent is hereby corrected as shown below:    On the title page:

item [75] correct the surname of the last-named inventor by deleting "Inuoe" and inserting —Inoue—.

Signed and Sealed this

Fifth Day of January, 1999

Attest:

Attesting Officer

*Acting Commissioner of Patents and Trademarks*